(12) United States Patent
Yoon

(10) Patent No.: US 10,948,631 B1
(45) Date of Patent: Mar. 16, 2021

(54) OPTICAL SYSTEMS AND METHODS FOR INCREASING INTERPUPILLARY DISTANCE OF A DISPLAY DEVICE

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 652 days.

(21) Appl. No.: 15/668,648

(22) Filed: Aug. 3, 2017

(51) Int. Cl.
    *G02B 3/00* (2006.01)
    *G02B 5/04* (2006.01)

(52) U.S. Cl.
    CPC .......... *G02B 3/00* (2013.01); *G02B 5/04* (2013.01)

(58) Field of Classification Search
    CPC .................................. G02B 3/00; G02B 5/04
    USPC .......................................................... 359/720
    See application file for complete search history.

(56) References Cited

U.S. PATENT DOCUMENTS

2004/0263613 A1* 12/2004 Morita ................. H04N 13/239
    348/51

* cited by examiner

*Primary Examiner* — Thomas K Pham
*Assistant Examiner* — Mitchell T Oestreich
(74) *Attorney, Agent, or Firm* — Morgan, Lewis & Bockius LLP

(57) ABSTRACT

An optical system includes a first beam shifter and a second beam shifter configured to couple with one or more display screens. The first beam shifter is configured to shift first light from a first portion of the one or more display screens in a first direction, and the second beam shifter is configured to shift second light from a second portion of the one or more display screens in a second direction that is distinct from the first direction. The second portion of the one or more display screens does not overlap with the first portion of the one or more display screens. Also disclosed are a method for increasing an effective interpupillary distance of light provided by a display screen, and a head-mounted display including the above-described optical system and one or more display screens configured to project light through the optical system.

20 Claims, 7 Drawing Sheets

OPTICAL SYSTEMS AND METHODS FOR INCREASING INTERPUPILLARY DISTANCE OF A DISPLAY DEVICE

TECHNICAL FIELD

This relates generally to head-mounted display devices, and more specifically to optical components used in head-mounted display devices.

BACKGROUND

Head-mounted display devices (also called herein head-mounted displays) are gaining popularity as means for providing visual information to users.

Head-mounted display devices typically include a display. An image from a first portion of the display is provided to a left eye of a user, and an image from a second portion of the display is provided to a right eye of the user. In some cases, the images provided by the first and second portions are stereoscopic images, which provide the perception of a three-dimensional depth to the user.

Head-mounted display devices include large displays to provide a large field-of-view. However, the size and weight of large displays have limited applications of head-mounted displays.

SUMMARY

Accordingly, there is a need for head-mounted displays that are compact and light, thereby enhancing the user's virtual reality experience. Small displays can enable compact and light head-mounted displays. However, small displays provide a limited field-of-view. In addition, an interpupillary distance available with a small display can be smaller than the interpupillary distance of typical users. This can also lead to an excessive convergence (e.g., cross-eyed viewing) of eyes and/or mismatch between the vergence and accommodation of the eyes.

The above deficiencies and other problems are reduced or eliminated by the disclosed devices, systems, and methods.

In accordance with some embodiments, an optical system includes a first beam shifter and a second beam shifter configured to couple with one or more display screens. The first beam shifter is configured to shift first light from a first portion of the one or more display screens in a first direction, and the second beam shifter is configured to shift second light from a second portion of the one or more display screens, that does not overlap with the first portion of the one or more display screens, in a second direction that is distinct from the first direction.

In accordance with some embodiments, a method for increasing an effective interpupillary distance of light provided by a display screen includes shifting with a first beam shifter coupled with the one or more display screens, first light from a first portion of the one or more display screens in a first direction. The method also includes shifting, with a second beam shifter, coupled with the one or more display screens, second light from a second portion of the one or more display screens in a second direction that is distinct from the first direction. The second portion of the one or more display screens does not overlap with the first portion of the one or more display screens.

In accordance with some embodiments, a head-mounted display system includes the optical system described herein above, and one or more display screens configured to project light through the optical system.

Thus, the disclosed embodiments provide devices and methods that increase nominal interpupillary distances.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
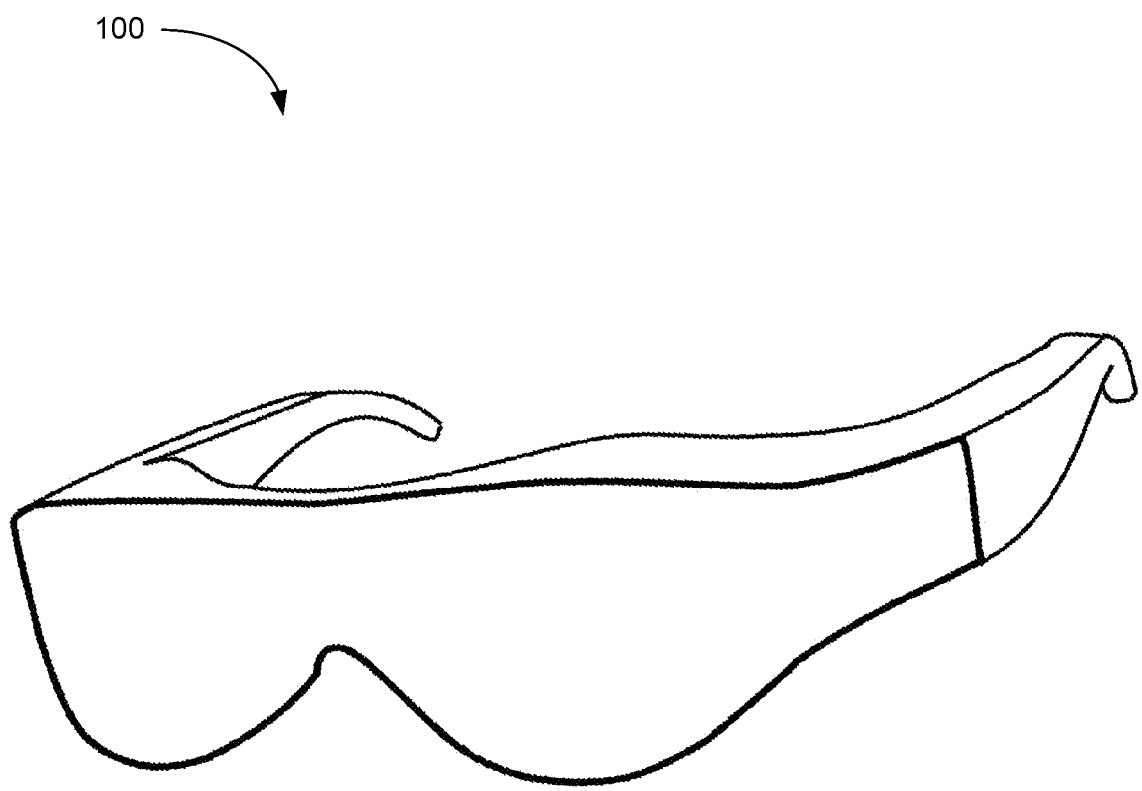
FIG. 1 is a perspective view of a display device in accordance with some embodiments.

These figures are not drawn to scale unless indicated otherwise.

DETAILED DESCRIPTION

Large and heavy head-mounted display devices have limited applications. Accordingly, there is a need for head-mounted display devices that are compact and light, which, in turn, enhance user experience with such devices. Small displays can enable compact and light head-mounted display devices. However, small displays provide a limited field-of-view. In addition, an interpupillary distance available with a small display can be smaller than the interpupillary distance of typical users. This can also lead to an excessive convergence (e.g., cross-eyed viewing) of eyes and/or mismatch between the vergence and accommodation.

Such deficiencies and other problems are reduced or eliminated by the disclosed devices, systems, and methods. The disclosed device, including beam shifters, shift images from small displays so as to increase the interpupillary distance of the projected images. Such devices, systems, and methods may optionally complement conventional devices, systems, and methods. Such devices, systems, and methods may optionally replace conventional devices, systems, and methods.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
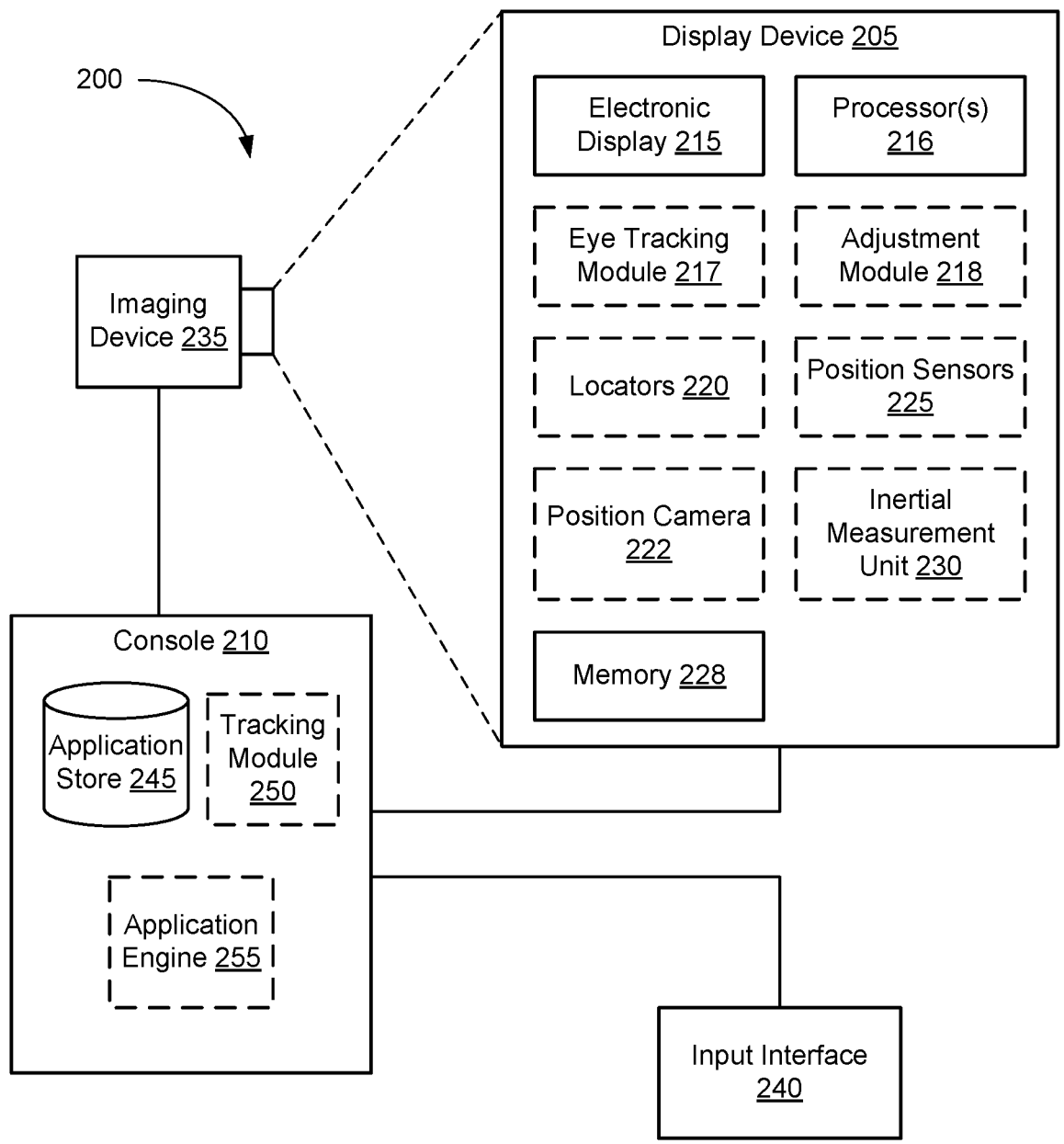
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
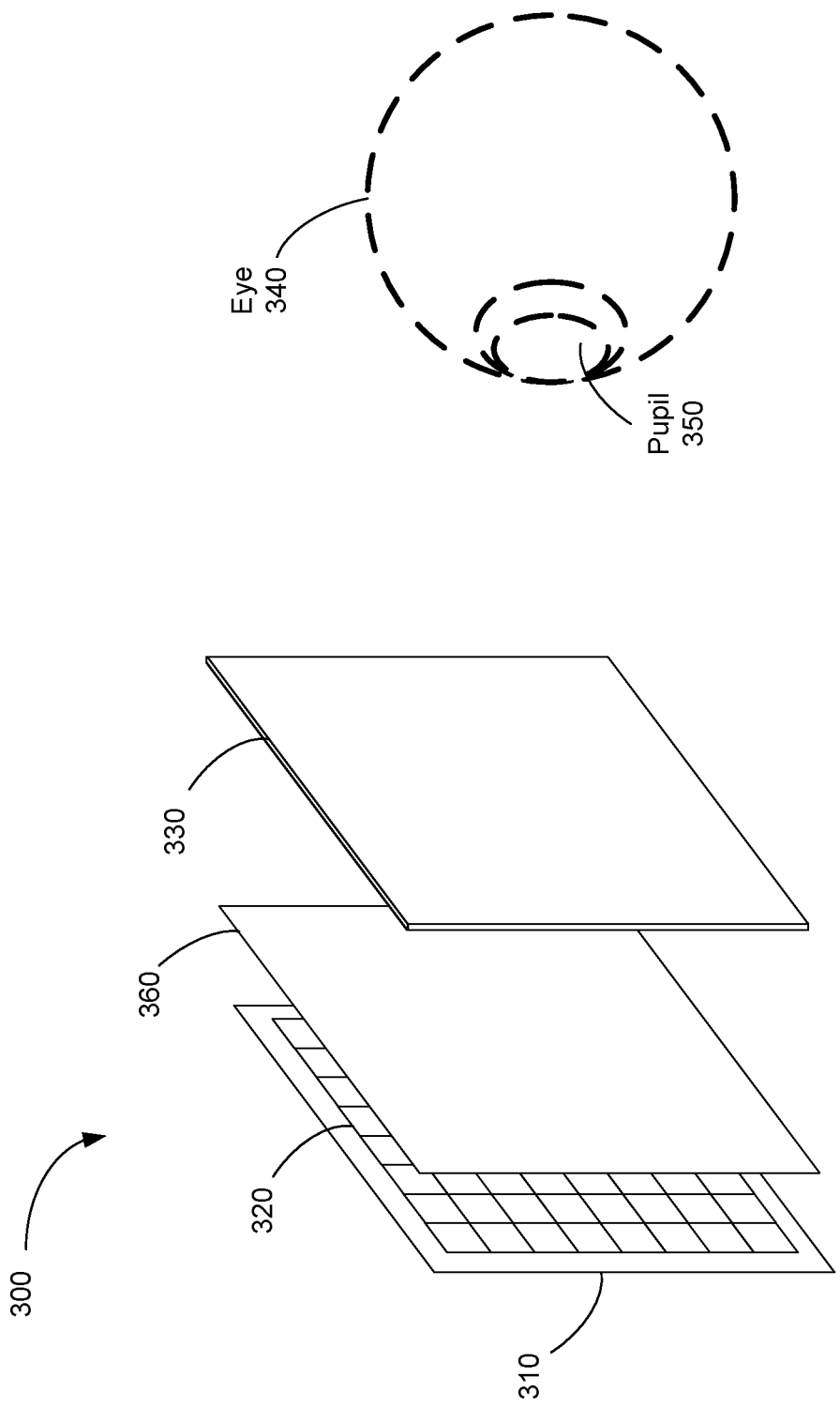
FIG. 3 is an isometric view of a display device in accordance with some embodiments.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310, one or more beam shifters 360, and one or more lenses 330. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more beam shifters 360 are configured to shift light from light emission device array 310. One or more lenses 330 receive the modified image light (e.g., attenuated light) from the emission intensity array (or directly from emission device array 310), and shifted by one or more beam shifters 360, and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 4A:
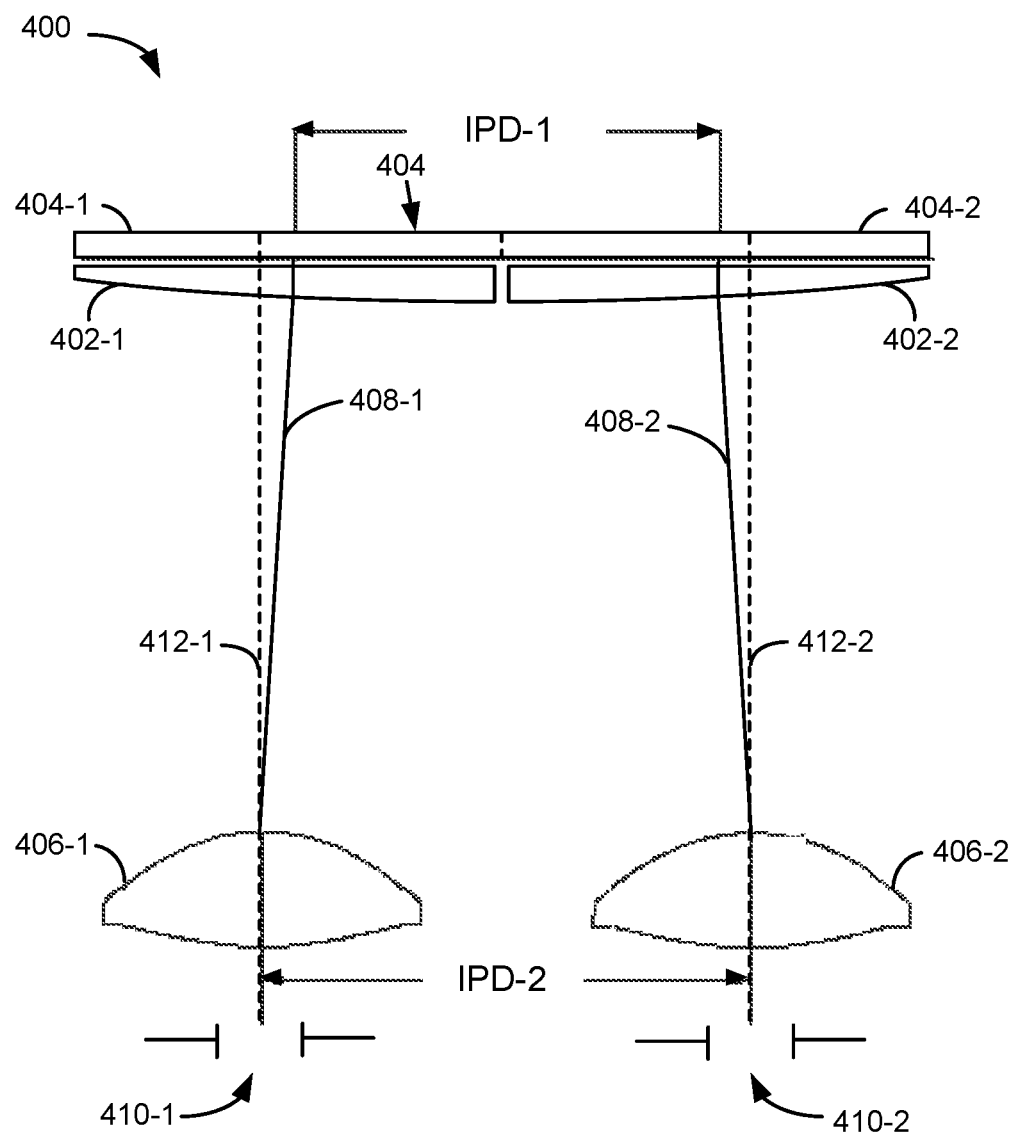
FIG. 4A is a schematic diagram illustrating an optical system in accordance with some embodiments.

FIG. 4A is a schematic diagram illustrating optical system 400 in accordance with some embodiments. Optical system 400 includes beam shifter 402-1 and beam shifter 402-2. Beam shifter 402-1 and beam shifter 402-2 are configured to couple with one or more display screens (e.g., display screen 404). Beam shifters 402-1 and 402-2 correspond to one or more beam shifters described above with respect to FIG. 3.

In some embodiments, beam shifter 402-1 and beam shifter 402-2 have respective curved surfaces facing away from display screen 404. In some embodiments, beam shifter 402-1 and beam shifter 402-2 have respective flat surfaces facing toward display screen 404, as shown in FIG. 4A. In some embodiments, beam shifters 402-1 and 402-2 collectively correspond to a single plano-convex lens (e.g., a cylindrical lens), where the convex surface of the plano-convex surface is facing away from display screen 404. In some embodiments, as shown in FIG. 4A, beam shifter 402-1 is adjacent to, but not in contact with, beam shifter 402-2. In some embodiments, beam shifter 402-1 is separate from beam shifter 402-2. In some embodiments, beam shifter 402-1 is in contact with beam shifter 402-2. In some embodiments, beam shifters 402-1 and 402-2 are integrated to form a single lens. In some embodiments, beam shifters 402-1 and 402-2 have shapes of wedged prisms.

Beam shifter 402-1 and beam shifter 402-2 are fabricated from an optical substrate. Such substrates include glass (e.g., N-BK7, N-SF11, and F2; barium borate; barium fluoride; magnesium fluoride; sapphire; calcium fluoride; fused silica; calcite; etc.), plastics (e.g., thermoplastic polymers including polycarbonates), polymethylmethacrylate (PMMA), other optical substrate materials and/or any combination of thereof.

In some embodiments, beam shifters 402-1 and 402-2 are configured to couple with display screen 404 using an adhesive (e.g., an optical adhesive, or a glue), or by one or more mechanical couplers (e.g., one or more screws, or one or more clasps). In some embodiments, beam shifters 402-1 and 402-2 are configured to removably couple with display screen 404 (e.g., by one or more screws, or one or more clamps).

In some embodiments, one or more display screens 404 correspond to light emission device array 310 described above with respect to FIG. 3. In FIG. 4A, display screen 400 is illustrated as having a flat display surface. In some embodiments, display screen 404 is curved or bent, and can have any shape suitable for a head-mounted display device. In some embodiments, display screen 404 includes display screen portions 404-1 and 404-2. In some embodiments, display screen portions 404-1 and 404-2 are portions of a continuous display, where display screen portion 404-1 corresponds to a first distinct portion of the screen display and display screen 404-2 corresponds to a second distinct portion of the screen display. The two portions of a continuous display screens do not overlap. In some embodiments, display screen portions 404-1 and 404-2 are distinct and separate display screens. In some embodiments, display screen 404 includes a display screen of a mobile device (e.g., a mobile phone). In some embodiments, display screen 404 is distinct and separate from optical system 400, and optical system 400 is configured to operate with display screen 404 (e.g., display screen 404 is part of a mobile device, such as a mobile phone, and optical system 400 is configured to removably couple with display screen 404 for receiving images from display screen 404).

Display screen portions 404-1 and 404-2 emit light, such as light rays 408-1 and 408-2, respectively (e.g., ray 408-1 is transmitted from a center of portion 404-1 and ray 408-2 is transmitted from a center of portion 404-2). Display screen portion 404-1 is configured to provide ray 408-1 for a left eye of a user and display screen portion 404-2 is configured to provide ray 408-2 for a right eye of the user. Rays 408-1 and 408-2 pass through respective beam shifters 402-1 and 402-2.

Beam shifter 402-1 is configured to shift ray 408-1 toward the left eye of the user (e.g., toward reference pupil 410-1 corresponding to a left pupil of the user) and beam shifter 402-2 is configured to shift ray 408-2 toward the right eye of the user (e.g., toward reference pupil 410-2 corresponding to a right pupil of the user). For example, beam shifter 402-1 changes a direction of ray 408-1 and beam shifter 402-2 changes a direction of ray 408-2. In FIG. 4A, beam shifters 402-1 and 402-2 shift respective light rays 408-1 and 408-2 further away from each other, thereby increasing the distance between rays 408-1 and 408-2 as they propagate toward the eyes of the user.

In some embodiments, optical system 400 further includes a plurality of lenses, such as lenses 406-1 and 406-2 in FIG. 4A. Lenses 406-1 and 406-2 correspond to lens 330 as described above with respect to FIG. 3. Lens 406-1 is positioned between beam shifter 402-1 and reference pupil 410-1 and lens 406-2 is positioned between beam shifter 402-2 and reference pupil 410-2. In FIG. 4A, lenses 406-1 and 406-2 are symmetric lenses. In some embodiments, lenses 406-1 and 406-2 are asymmetric lenses, such as wedged or canted lenses.

Lens 406-1 is configured to steer ray 408-1 from beam shifter 402-1 toward reference pupil 410-1. Lens 406-2 is configured to steer ray 408-2 from beam shifter 402-2 toward reference pupil 410-2. In some embodiments, ray 408-1 steered by lens 406-1 propagates in a direction parallel to axis 412-1, and ray 408-2 steered by lens 406-2 propagates in a direction parallel to axis 412-2. In some embodiments, axis 412-1 is perpendicular to display screen portion 404-1 and axis 412-2 is perpendicular to display screen portion 404-2.

Ray 408-1 and ray 408-2, on respective display screen portions 404-1 and 404-2, define interpupillary distance IPD-1 (e.g., before passing through respective beam shifters 402-1 and 402-2). In contrast, ray 408-1 and ray 408-2, upon entering reference pupils 410-1 and 410-2, define interpupillary distance IPD-2. Beam shifters 402-1 and 402-2 increase interpupillary distance IPD-2 so that interpupillary distance IPD-2 substantially corresponds to interpupillary distance of a user (e.g., the distance between a center of the pupil of the left eye of a user and a center of the pupil of the right eye of the user). This reduces excessive convergence of the eyes of the user.

In some embodiments, interpupillary distance IPD-2 ranges between 50 mm and 80 mm (e.g., interpupillary distance IPD-2 ranges between 50 and 55 mm, 55 and 60 mm, 60 and 65 mm, 65 and 70 mm, 70 and 75 mm, or 75 and 80 mm). In some embodiments, interpupillary distance IPD-2 is about 63.5 mm (e.g., between 63 mm and 64 mm). In optical system 400 configured to increase the nominal interpupillary distance, interpupillary distance IPD-2 is greater than interpupillary distance IPD-1. For example, in some cases, optical system 400 increases an interpupillary distance from approximately 55 mm (e.g., interpupillary distance IPD-1) to 63.5 mm (e.g., interpupillary distance IPD-2).

Figure 4B:
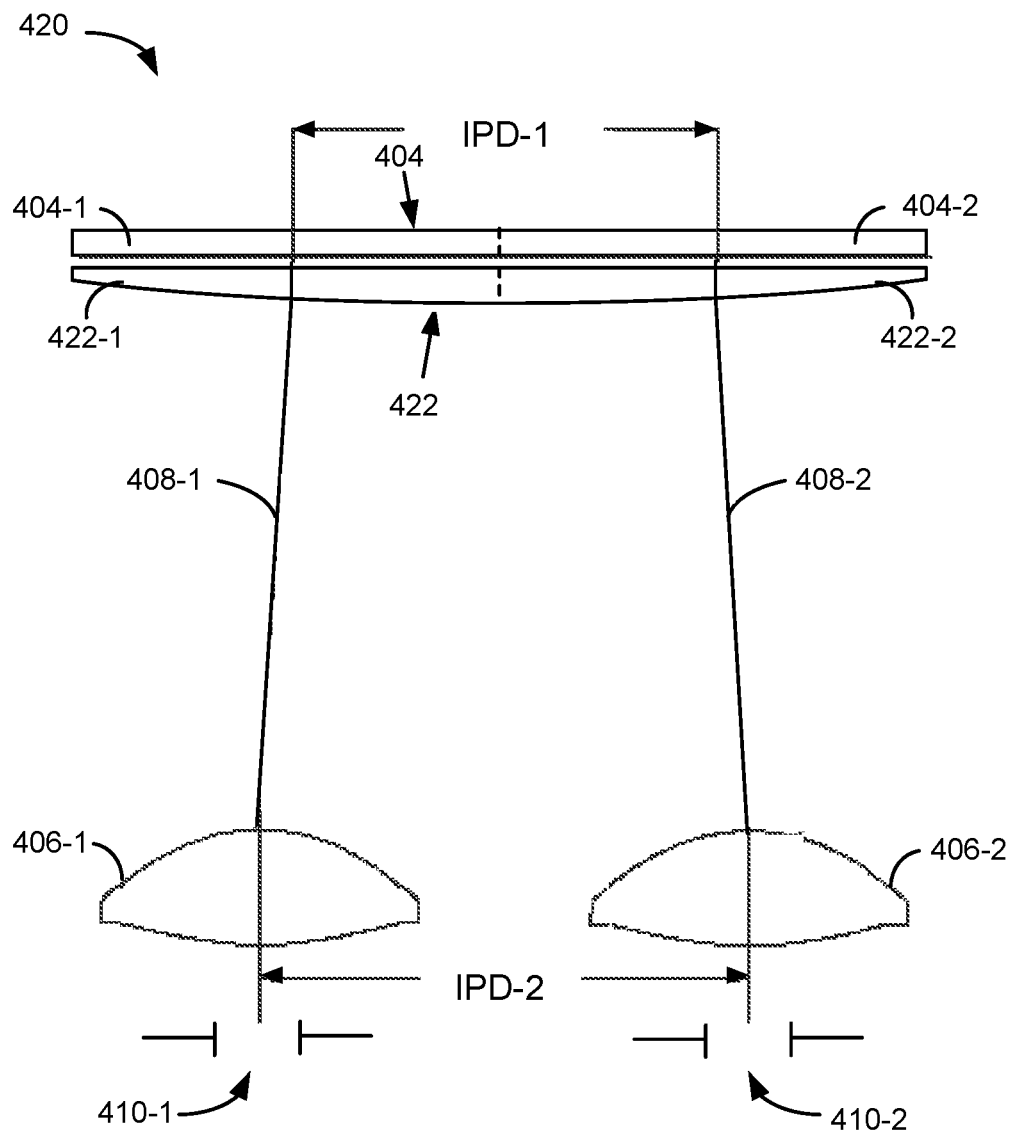
FIG. 4B is a schematic diagram illustrating an optical system in accordance with some embodiments.

FIG. 4B is a schematic diagram illustrating optical system 420 in accordance with some embodiments. Optical system 420 is similar to optical system 400 described above with respect to FIG. 4A, except that optical system 420 includes single beam shifter 422. Beam shifter 422 includes first portion 422-1 and second portion 422-2. In some embodiments, first portion 422-1 corresponds to beam shifter 402-1 (FIG. 4A) and second portion 422-2 corresponds to beam shifter 402-2 (FIG. 4A). In FIG. 4B, beam shifter 422 is a plano-convex lens (e.g., a cylindrical lens), and the convex lens of beam shifter 422 is positioned toward lenses 406-1 and 406-2 and facing away from display screen 404.

Figure 4C:
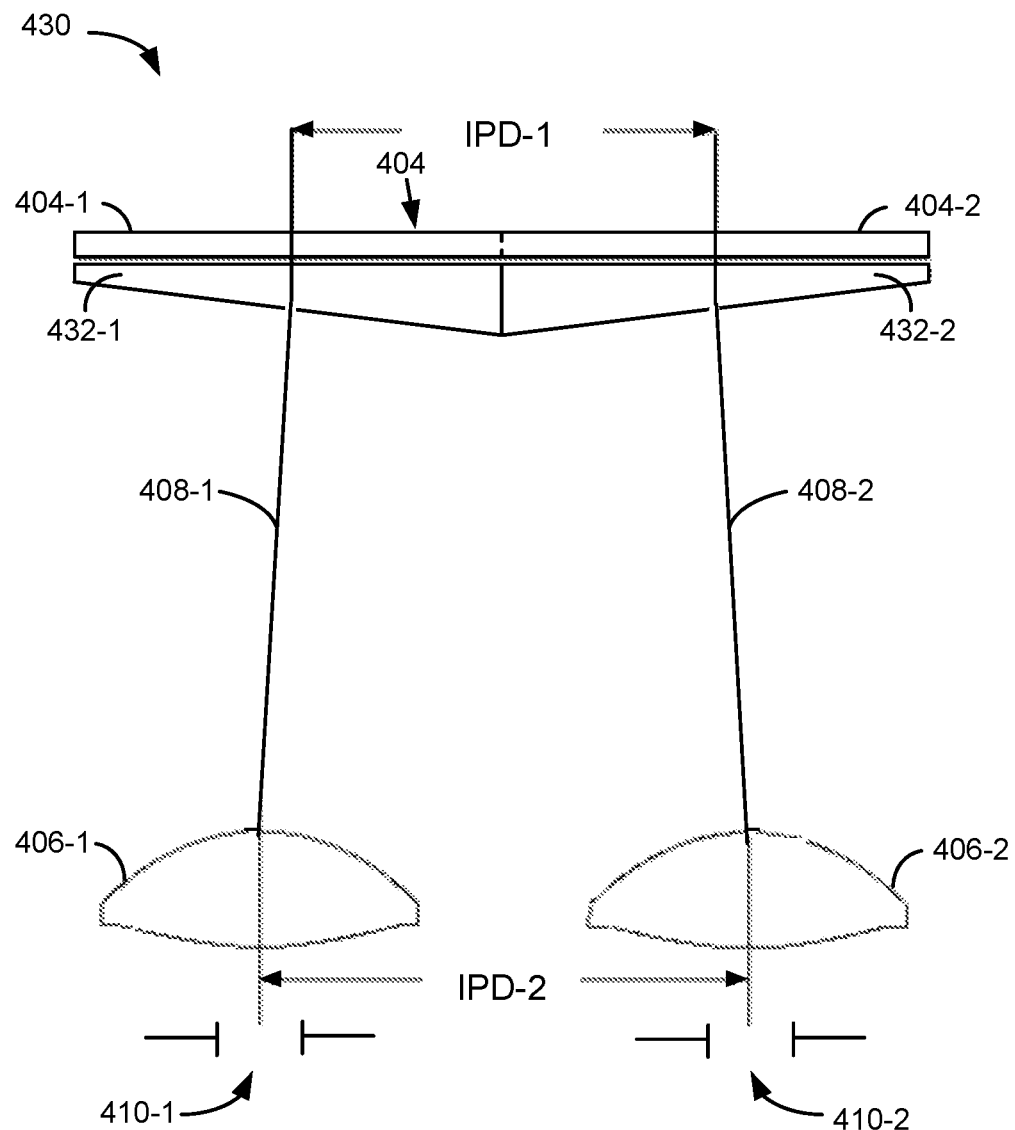
FIG. 4C is a schematic diagram illustrating an optical system in accordance with some embodiments.

FIG. 4C is a schematic diagram illustrating optical system 430 in accordance with some embodiments. Optical system 430 similar to optical system 400 described above with respect to FIG. 4A, except that prisms 432-1 and 432-2 are used as beam shifters. In FIG. 4C, each of prisms 432-1 and 432-2 has a shape of a wedge prisms. In some embodiments, prisms 432-1 and 432-2 are positioned to be in contact with each other, as shown in FIG. 4C.

Figure 4D:
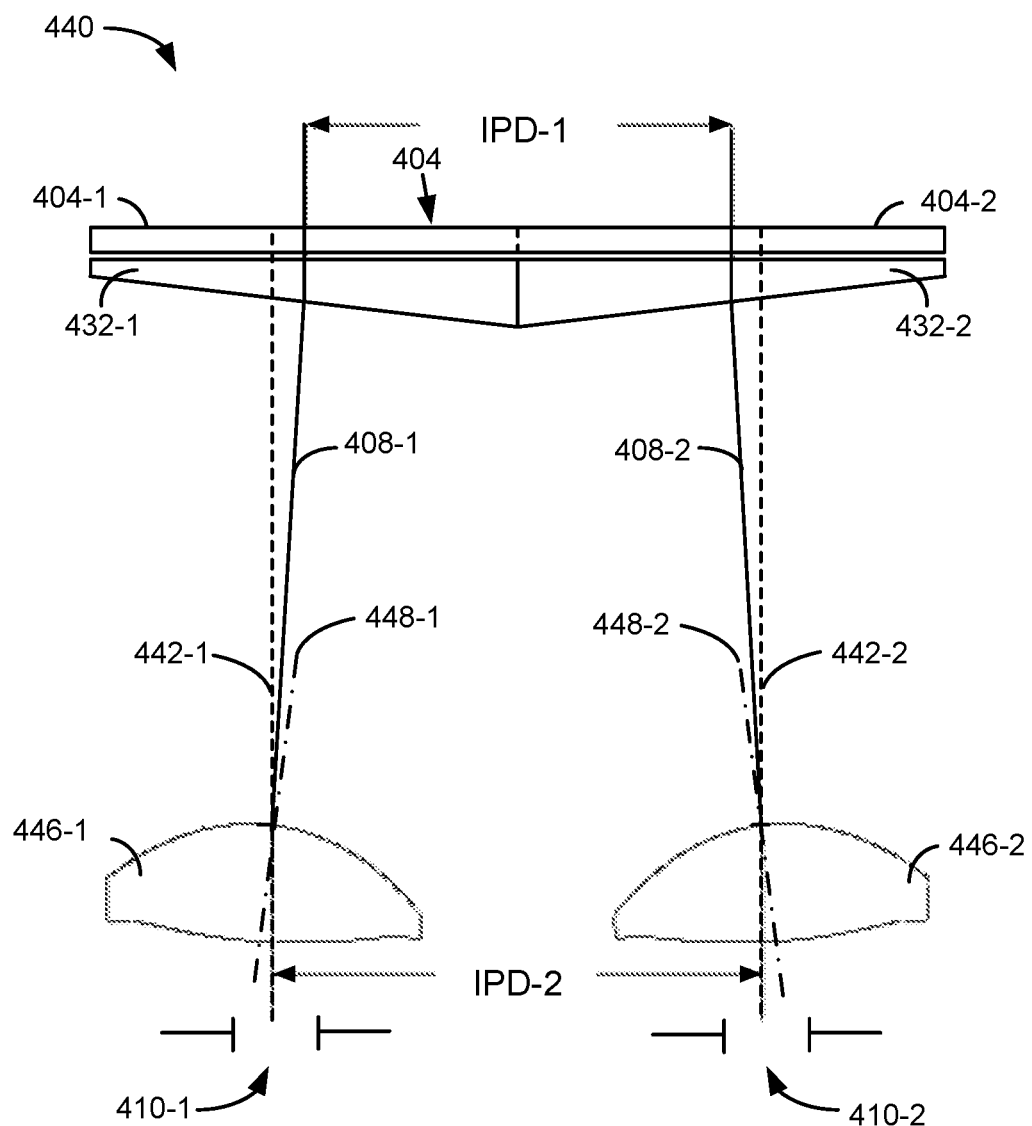
FIG. 4D is a schematic diagram illustrating an optical system in accordance with some embodiments.

FIG. 4D is a schematic diagram illustrating optical system 440 in accordance with some embodiments. Optical system 440 corresponds to optical system 430 described above with respect to FIG. 4C, except that asymmetric lenses 446-1 and 446-2 (e.g., wedged lenses) are used instead of symmetric lenses 406-1 and 406-2. For example, each of lenses 446-1 and 446-2 have a first thickness on a temporal side and a second thickness on a nasal side, the first thickness being distinct from the second thickness (e.g., the first thickness is greater than the second thickness). The wedged lens steers rays 408-1 and 408-2 toward respective reference pupils 410-1 and 410-2. In some embodiments, asymmetric lenses 446-1 and 446-2 are tilted as shown in FIG. 4D. Alternatively, tilted symmetric lenses are used (e.g., in some embodiments, lenses 406-1 and 406-2 in FIG. 4A are tilted). Tilted lenses also facilitate steering of rays for increasing the interpupillary distance.

Lens 446-1 defines first axis 448-1 (e.g., an optical axis of lens 446-1), which is not parallel to axis 442-1 that is perpendicular to display screen portion 404-1. Lens 446-2 defines second axis 448-2 (e.g., an optical axis of lens 446-2), which is not parallel to axis 442-2 that is perpendicular to display screen portion 404-2. As shown in FIG. 4D, the first axis and the second axis are not parallel to each other.

In light of these principles, we now turn to certain embodiments of a head-mounted display device.

In accordance with some embodiments, an optical system includes a first beam shifter and a second beam shifter configured to couple with one or more display screens. The first beam shifter is configured to shift first light from a first portion of the one or more display screens in a first direction, and the second beam shifter is configured to shift second light from a second portion of the one or more display screens, that does not overlap with the first portion of the one or more display screens, in a second direction that is distinct from the first direction. For example, in FIG. 4A, optical system 400 includes beam shifters 402-1 and 402-2. Beam shifters 402-1 and 402-2 are configured to couple with one or more display screens (e.g., display screen 404, using an adhesive or one or more mechanical couplers). Beam shifter 402-1 shifts ray 408-1, emitted by display screen portion 404-1, in a first direction (e.g., toward left) and beam shifter 402-2 shifts ray 408-2, emitted by display screen portion 404-2, in a second direction that is distinct from the first direction (e.g., toward right). Rays 408-1 and 408-2 are shifted away from the center of optical system 400. Display screen portion 404-2 does not overlap with display screen portion 404-1.

In some embodiments, the first direction is not parallel to the second direction (e.g., in FIG. 4A, the direction of ray 408-1, after passing through beam shifter 402-1, is not parallel to the direction of ray 408-2, after passing through beam shifter 402-2).

In some embodiments, the optical system defines a reference axis (e.g., reference axes 412-1 and 412-2 shown in FIG. 4A, which are perpendicular to display screen 404). The first direction has a respective angle (e.g., 15 degrees) with the reference axis, and the second direction has the respective angle (e.g., the same 15 degrees) with the reference axis.

In some embodiments, the one or more display screens are configured to provide the first light (e.g., ray 408-1) from the first portion of the one or more display screens for projection toward a left eye of a user and provide the second light (e.g., ray 408-2) from the second portion of the one or more display screens for projection toward a right eye of the user. For example, in FIG. 4A, display screen portion 404-1 provides ray 408-1 for projection toward reference pupil 410-1, which corresponds to a left eye of a user. Display screen portion 404-2 provides ray 408-2 for projection toward reference pupil 410-2, which corresponds to a right eye of the user.

In some embodiments, the optical system further includes a plurality of lenses, including at least a first lens and a second lens that is distinct from the first lens (e.g., lenses 406-1 and 406-2 in FIG. 4A). The first lens is configured to steer the first light from the first portion of the one or more display screens after passing through the first beam shifter, and the second lens is configured to steer the second light from the second portion of the one or more display screens after passing through the second beam shifter. For example, lens 406-1 steers ray 408-1 from beam shifter 402-1 toward reference pupil 410-1 and lens 406-2 steers ray 408-2 from beam shifter 402-2 toward reference pupil 410-2.

In some embodiments, the first light and the second light provided by the one or more display screens, before passing through respective beam shifters of the first beam shifter and the second beam shifter, define a first interpupillary distance (e.g., interpupillary distance IPD-1). The first light and the second light, after passing through respective lenses of the first lens and the second lens, define a second interpupillary distance (e.g., interpupillary distance IPD-2) that is greater than the first interpupillary distance. For example, in FIG. 4A, rays 408-1 and 408-2, before passing through respective beam shifters 402-1 and 402-2, define interpupillary distance IPD-1. After passing through respective lenses 406-1 and 406-2, rays 408-1 and 408-2 define interpupillary distance IPD-2. IPD-2 is greater than IPD-1. In some embodiments, the first light, before passing through the first beam shifter, and the second light, before passing through the second beam shifter, correspond to the first interpupillary distance (e.g., a distance between the first light and the second light on display screen 404 is interpupillary distance IPD-1). In some embodiments, the first light, after passing through the first lens, and the second light, after passing through the second lens, correspond to the second interpupillary distance (e.g., a distance between the first light and the second light after passing through respective lenses 406-1 and 406-2 is interpupillary distance IPD-2).

In some embodiments, the first beam shifter and the second beam shifter collectively corresponds to a single lens that is distinct from the first lens and the second lens. For example, optical system 420 includes beam shifters 422-1 and 422-2 which collectively correspond to a single lens in FIG. 4B. In some embodiments, the single lens is a plano-convex lens (e.g., a plano-convex cylindrical lens). In some embodiments, a convex surface of the plano-convex lens is positioned toward the first lens and the second lens (e.g., the convex surface is positioned away from display screen 404).

In some embodiments, the first lens is a symmetric lens, and the second lens is a symmetric lens (e.g., lenses 406-1 and 406-2 shown in FIG. 4A are symmetric lenses).

In some embodiments, the first beam shifter corresponds to a first wedge prism, and the second beam shifter corresponds to a second wedge prism (e.g., beam shifters 432-1 and 432-2 shown in FIG. 4C are wedge prisms).

In some embodiments, the first beam shifter is integrated with the second beam shifter. For example, beam shifter portions 422-1 and 422-2 in FIG. 4B are integrated to form single beam shifter 422.

In some embodiments, the first beam shifter is in contact with the second beam shifter (e.g., beam shifter 432-1 is in contact with beam shifter 432-2 in FIG. 4C). In some embodiments, beam shifter 432-1 is integrated with beam shifter 432-2 to form a single beam shifter.

In some embodiments, the first beam shifter is located adjacent to, but not in contact with, the second beam shifter (e.g., beam shifter 402-1 is adjacent to, but not in contact with, beam shifter 402-2 in FIG. 4A).

In some embodiments, the first lens is an asymmetric lens, and the second lens is an asymmetric lens (e.g., lenses 446-1 and 446-2 are asymmetric lenses in FIG. 4D). In some embodiments, the first lens is a wedged lens, and in some embodiments, the second lens is a wedged lens (e.g., lenses 446-1 and 446-2 are wedged and/or canted lenses).

In some embodiments, the first lens defines a first axis (e.g., axis 448-1 in FIG. 4D) that is at a respective tilt angle from a reference axis (e.g., axis 442-1 in FIG. 4D) that corresponds to a surface normal of the one or more display screens. The second lens defines a second axis (e.g., axis 448-2 in FIG. 4D) that is at the respective tilt angle from the reference axis (e.g., axis 442-2 in FIG. 4D) that corresponds to the surface normal of the one or more display screens. The first axis is not parallel to the second axis.

In some embodiments, the respective tilt angle is less than 60 degrees.

In some embodiments, the respective tilt angle is greater than 1 degree (e.g., between 1 and 5 degrees, 5 and 10 degrees, 10 and 15 degrees, 15 and 20 degrees, 20 and 25 degrees, etc.). In some embodiments, the respective tilt angle is 5 degrees. In some embodiments, the respective tilt angle is 10 degrees. In some embodiments, the respective tilt angle is 15 degrees. In some embodiments, the respective tilt angle is 20 degrees. In some embodiments, the respective tilt angle is 25 degrees. In some embodiments, the respective tilt angle is 30 degrees.

In some embodiments, the first lens is a symmetric lens, and the second lens is a symmetric lens (e.g., lenses 406-1 and 406-2 in FIG. 4A).

In some embodiments, the optical system further includes the one or more display screens (e.g., optical system 400 includes one or more display screens 404 as shown in FIG. 4A).

In some embodiments, the one or more display screens are removably coupled with the first beam shifter and the second beam shifter. For example, display screen 404 in FIG. 4A is, in some embodiments, removably coupled with beam shifters 402-1 and 402-2 (e.g., using one or more mechanical couplers such as screws and/or clamps or using removal adhesives). In some embodiments, the one or more display screens are directly coupled with the first beam shifter and the second beam shifter. In some embodiments, the one or more display screens are indirectly coupled with the first beam shifter and the second beam shifter (e.g., the one or more display screens are coupled with a frame of the optical system that includes the first beam shifter and the second beam shifter).

In some embodiments, the one or more display screens comprise a display screen of a mobile device (e.g., a mobile phone). In some embodiments, the one or more display screens are distinct and separate from the optical system (e.g., the optical system does not include the one or more display screens, although the optical system is configured to operate with the display screen). For example, in some embodiments, display screen 404 is a display screen of a mobile phone and is configured to operate with optical system 400 when display screen 404 is coupled with (e.g., mounted on, or attached to) optical system 400.

In accordance with some embodiments, a method for increasing an effective interpupillary distance of light provided by a display screen includes shifting with a first beam shifter coupled with the one or more display screens, first light from a first portion of the one or more display screens in a first direction (e.g., ray 408-1 in FIG. 4A). The method also includes shifting, with a second beam shifter, coupled with the one or more display screens, second light from a second portion of the one or more display screens, in a second direction that is distinct from the first direction (e.g., ray 408-2 in FIG. 4A). The second portion of the one or more display screens does not overlap with the first portion of the one or more display screens (e.g., in FIG. 4A, display screen portion 404-1 and display screen portion 404-2 do not even partially overlap with each other). In some embodiments, light emitted by the first portion of the one or more display screens is not transmitted through the second beam shifter and light emitted by the second portion of the one or more display screens is not transmitted through the first beam shifter.

In accordance with some embodiments, a head-mounted display system includes any optical system described herein, and one or more display screens configured to project light through the optical system (e.g., head-mounted display device 100 in FIG. 1 includes optical system 400 and display screen 404 shown in FIG. 4A).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical system, comprising:
a first beam shifter and a second beam shifter configured to couple with one or more display screens, wherein the first beam shifter is configured to shift first light from a first portion of the one or more display screens in a first direction, and the second beam shifter is configured to shift second light from a second portion of the one or more display screens, that does not overlap with the first portion of the one or more display screens, in a second direction that is distinct from the first direction; and
one or more lenses optically coupled with the first beam shifter and the second beam shifter, wherein the first light provided from a first position on the one or more display screens and the second light provided from a second position, spaced apart from the first position by a first distance, on the one or more display screens have a second distance greater than the first distance after passing through the first and second beam shifters and the one or more lenses.

2. The optical system of claim 1, wherein:
the one or more display screens are configured to provide the first light from the first portion of the one or more display screens for projection toward a left eye of a user and provide the second light from the second portion of the one or more display screens for projection toward a right eye of the user.

3. The optical system of claim 1, wherein:
the one or more lenses include a at least a first lens and a second lens that is distinct from the first lens, wherein the first lens is configured to steer the first light from the first portion of the one or more display screens after passing through the first beam shifter, and the second lens is configured to steer the second light from the second portion of the one or more display screens after passing through the second beam shifter.

4. The optical system of claim 3, wherein:
the first light and the second light provided by the one or more display screens, before passing through respective beam shifters of the first beam shifter and the second beam shifter, define a first interpupillary distance; and the first light and the second light, after passing through respective lenses of the first lens and the second lens, define a second interpupillary distance that is greater than the first interpupillary distance.

5. The optical system of claim 3, wherein:
the first beam shifter and the second beam shifter collectively corresponds to a single lens that is distinct from the first lens and the second lens.

6. The optical system of claim 5, wherein:
the first lens is a symmetric lens; and
the second lens is a symmetric lens.

7. The optical system of claim 3, wherein:
the first beam shifter corresponds to a first wedge prism; and
the second beam shifter corresponds to a second wedge prism.

8. The optical system of claim 7, wherein:
the first beam shifter is integrated with the second beam shifter.

9. The optical system of claim 7, wherein:
the first beam shifter is in contact with the second beam shifter.

10. The optical system of claim 7, wherein:
the first beam shifter is located adjacent to, but not in contact with, the second beam shifter.

11. The optical system of claim 7, wherein:
the first lens is an asymmetric lens; and
the second lens is an asymmetric lens.

12. The optical system of claim 11, wherein:
the first lens defines a first optical axis that is at a respective tilt angle from a reference axis that corresponds to a surface normal of the one or more display screens;
the second lens defines a second optical axis that is at the respective tilt angle from the reference axis that corresponds to the surface normal of the one or more display screens; and
the first optical axis is not parallel to the second optical axis.

13. The optical system of claim 12, wherein:
the respective tilt angle is less than 60 degrees.

14. The optical system of claim 7, wherein:
the first lens is a symmetric lens; and
the second lens is a symmetric lens.

15. The optical system of claim 14, wherein:
the first lens defines a first optical axis that is at a respective tilt angle from a reference axis that corresponds to a surface normal of the one or more display screens;
the second lens defines a second optical axis that is at the respective tilt angle from the reference axis that corresponds to the surface normal of the one or more display screens; and
the first optical axis is not parallel to the optical second axis.

16. The optical system of claim 15, wherein:
the respective tilt angle is less than 60 degrees.

17. The optical system of claim 1, further comprising:
the one or more display screens.

18. The optical system of claim 1, wherein:
the one or more display screens are removably coupled with the first beam shifter and the second beam shifter.

19. A method for increasing an effective interpupillary distance of light provided by a display screen, comprising:
shifting, with a first beam shifter coupled with one or more display screens, first light from a first portion of the one or more display screens in a first direction; and
shifting, with a second beam shifter, coupled with the one or more display screens, second light from a second portion of the one or more display screens, that does not overlap with the first portion of the one or more display screens, in a second direction that is distinct from the first direction, wherein:
the first beam shifter and the second beam shifter are optically coupled with one or more lenses, and
the first light provided from a first position on the one or more display screens and the second light provided from a second position, spaced apart from the first position by a first distance, on the one or more display screens have a second distance greater than the first distance after passing through the first and second beam shifters and the one or more lenses.

20. A head-mounted display system, comprising:
the optical system of claim 1; and
one or more display screens configured to project light through the optical system.

* * * * *